(12) United States Patent
Takashima (10) Patent No.: US 9,160,221 B2
(45) Date of Patent: Oct. 13, 2015

(54) LENS HOLDER DRIVING DEVICE CAPABLE OF INHIBITING DRIVING COIL FROM PEELING FROM LENS HOLDER

(75) Inventor: Koji Takashima, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 169 days.

(21) Appl. No.: 13/480,741

(22) Filed: May 25, 2012

(65) Prior Publication Data

US 2012/0300322 A1 Nov. 29, 2012

(30) Foreign Application Priority Data

May 25, 2011 (JP) .................................. 2011-116736
Mar. 2, 2012 (JP) .................................. 2012-046177

(51) Int. Cl.
*G02B 7/02* (2006.01)
*H02K 41/035* (2006.01)
*G02B 7/08* (2006.01)

(52) U.S. Cl.
CPC .............. *H02K 41/0356* (2013.01); *G02B 7/08* (2013.01)

(58) Field of Classification Search
CPC ........... H02K 41/0354; H02K 41/0356; G02B 7/04–7/09
USPC ................... 359/694, 696, 821–824, 827, 829
See application file for complete search history.

(56) References Cited

U.S. PATENT DOCUMENTS

| | | | |
|---|---|---|---|
| 2007/0086770 A1 | 4/2007 | Okita et al. | |
| 2010/0007971 A1* | 1/2010 | Usami et al. | 359/811 |
| 2010/0142066 A1* | 6/2010 | Okabe et al. | 359/824 |
| 2011/0051264 A1* | 3/2011 | Kim | 359/822 |

FOREIGN PATENT DOCUMENTS

| | | |
|---|---|---|
| JP | 11211957 A | 8/1999 |
| JP | 2003219235 A | 7/2003 |
| JP | 2006-208427 A | 8/2006 |
| JP | 2007108596 A | 4/2007 |
| JP | 2007-316395 A | 12/2007 |
| JP | 2008033252 A | 2/2008 |
| JP | 2008-310237 A | 12/2008 |
| JP | 2009-265210 A | 11/2009 |
| JP | 2010091894 A | 4/2010 |

OTHER PUBLICATIONS

Japanese Office Action dated Feb. 12, 2015, issued in counterpart Japanese Application No. 2012-046177.

* cited by examiner

*Primary Examiner* — Thomas K Pham
*Assistant Examiner* — Cara Rakowski
(74) *Attorney, Agent, or Firm* — Holtz, Holtz, Goodman & Chick PC (57) ABSTRACT

A lens holder driving device includes a lens holder for holding a lens assembly and a ring-shaped driving coil fixed to the lens holder. The lens holder has N bonded surfaces for bonding N areas of an inner surface of the driving coil to a tubular portion of the lens holder by means of an adhesive agent. At least one of the N bonded surfaces has a peeling inhibiting arrangement for inhibiting the driving coil from peeling from the lens holder after the N areas of the inner surface of the driving coil are bonded to the N bonded surfaces by means of the adhesive agent.

7 Claims, 12 Drawing Sheets

LENS HOLDER DRIVING DEVICE CAPABLE OF INHIBITING DRIVING COIL FROM PEELING FROM LENS HOLDER

This application is based upon and claims the benefit of priority from Japanese Patent Application No. JP 2011-116736, filed on May 25, 2011, and Japanese Patent Application No. JP 2012-046177, filed on Mar. 2, 2012, the disclosures of which are incorporated herein in their entirety by reference.

BACKGROUND OF THE INVENTION

This invention relates to a lens holder driving device and, in particular, to fixed structure of a driving coil for a lens holder.

Mobile terminals such as camera-equipped cellular mobile phones often mount compact cameras therein. The compact camera is provided with an autofocus lens holder driving device. Previously, various autofocus lens holder driving devices have been proposed. As a driving source (a driving method) for use in such as a lens holder driving device, a VCM method using a voice coil motor (VCM) is known. The lens holder driving device of the VCM method comprises, as the driving source (a driving portion), a driving coil (a coil) and a magnetic circuit which is composed of a yoke and a permanent magnet. The lens holder driving device is also referred to as an actuator. The driving sources (driving portions) of the VCM method are broadly divided into driving portions of "moving coil method" and driving portions of "moving magnet method."

On the other hand, a lens holder driving device of the type described comprises a lens holder (a lens supporting body) for holding a lens assembly (a lens). In the lens holder driving device comprising the driving portion of "moving coil method", the above-mentioned driving coil (coil) is fixed to the lens holder (the lens support body). Previously, various fixed structures have been adopted.

By way of illustration, in a lens holder driving device disclosed in Japanese Unexamined Patent Application Publication No. 2008-310237 (JP-A-2008-310237) (which will also be called Patent Document 1), a coil is fixed to an outer side of a lens supporting body. The lens supporting body comprises a plurality of coil fixed portions each projecting in a radial direction outwards and the coil has a bottom portion which is fixed to the coil fixed portions.

In addition, in a lens holder driving device disclosed in Japanese Unexamined Patent Application Publication No. 2009-265210 (JP-A-2009-265210) (which will also be called Patent Document 2), a coil is bonded and fixed to a coil fixed portion which is integrally provided to a lens supporting body. The lens fixed portion projects from the lens support body in a radial direction outwards. Accordingly, the coil has a bottom portion which is bonded and fixed to the lens fixed portion.

In a lens holder driving device disclosed in Japanese Unexamined Patent Application Publication No. 2006-208427 (JP-A-2006-208427) (which will also be called Patent Document 3), a flange portion mounted in a rim of a lens support body is provided with a coil mounting portion and a coil has a bottom portion which is bonded and fixed to the coil mounting portion. In Patent Document 3, the coil mounting portion has a surface on which an infinite number of bumps and dips are formed in order to expand an adhesive area of adhesives and thereby enhancing adhesive strength for the coil. In this event, the coil is bonded and fixed to the coil mounting portion by filling the adhesives between the bottom portion of the coil and the bumps and dips in the coil mounting portion.

In a lens holder driving device disclosed in Japanese Unexamined Patent Application Publication No. 2007-316395 (JP-A-2007-316395) (which will also be called Patent Document 4), a coil is fixed to an outer side portion of a lens supporting body. Patent Document 4 illustrates, in FIG. 2 thereof, that the outer side portion of the lens supporting body has grooves which are bored in parallel with an optical direction. It seems that the grooves are filling grooves for pouring adhesives in order to fix the coil to the outer side portion of the lens supporting body on bonding.

In the above-mentioned lens holder driving devices disclosed in Patent Documents 1-4, the bottom portion of the coil is bonded and fixed to the coil fixed portion (the coil mounting portion) of the lens supporting body.

In mobile terminals mounting the compact cameras provided with the autofocus lens holder driving devices having such fixed structures, there is a possibility of peeling the driving coil from the lens holder by moving (shifting) the driving coil for the lens holder in the optical direction caused by an impact on dropping the mobile terminals or the like.

For example, in Patent Document 3, it is difficult to inhibit (prevent) the coil from peeling from the lens supporting body against impact force of the coil for the lens supporting body in the optical direction because the coil is bonded and fixed to the coil mounting portion by filling the adhesives between the bottom portion of the coil and the bumps and dips in the coil mounting portion.

In addition, in Patent Document 4, the filling grooves bored to the outer side portion of the lens supporting body in parallel with the optical direction are for pouring the adhesives on boding and are not for enhancing the adhesive strength of the coil for the lens supporting body as the above-mentioned Patent Document 3.

SUMMARY OF THE INVENTION

It is therefore an exemplary object of the present invention to provide a lens holder driving device which is capable of inhibit (prevent) a driving coil from peeling from a lens holder against impact force of the driving coil in an optical direction.

Other objects of this invention will become clear as the description proceeds.

On describing the gist of an exemplary aspect of this invention, it is possible to be understood that a lens holder driving device comprises a lens holder including a tubular portion for holding a lens assembly and a ring-shaped driving coil fixed to the lens holder so as to position at outside circumference of the tubular portion. According to the exemplary aspect of this invention, the lens holder has N bonded surfaces for bonding N areas of an inner surface of the driving coil to the tubular portion by means of an adhesive agent, respectively, where N represents an integer which is not less than two. At least one of the N bonded surfaces has a peeling inhibiting arrangement for inhibiting the driving coil from peeling from the lens holder after the inner surface of the driving coil is bonded to the N bonded surfaces at the N areas thereof by means of the adhesive agent.

DESCRIPTION OF THE PREFERRED EMBODIMENTS

Figure 1:
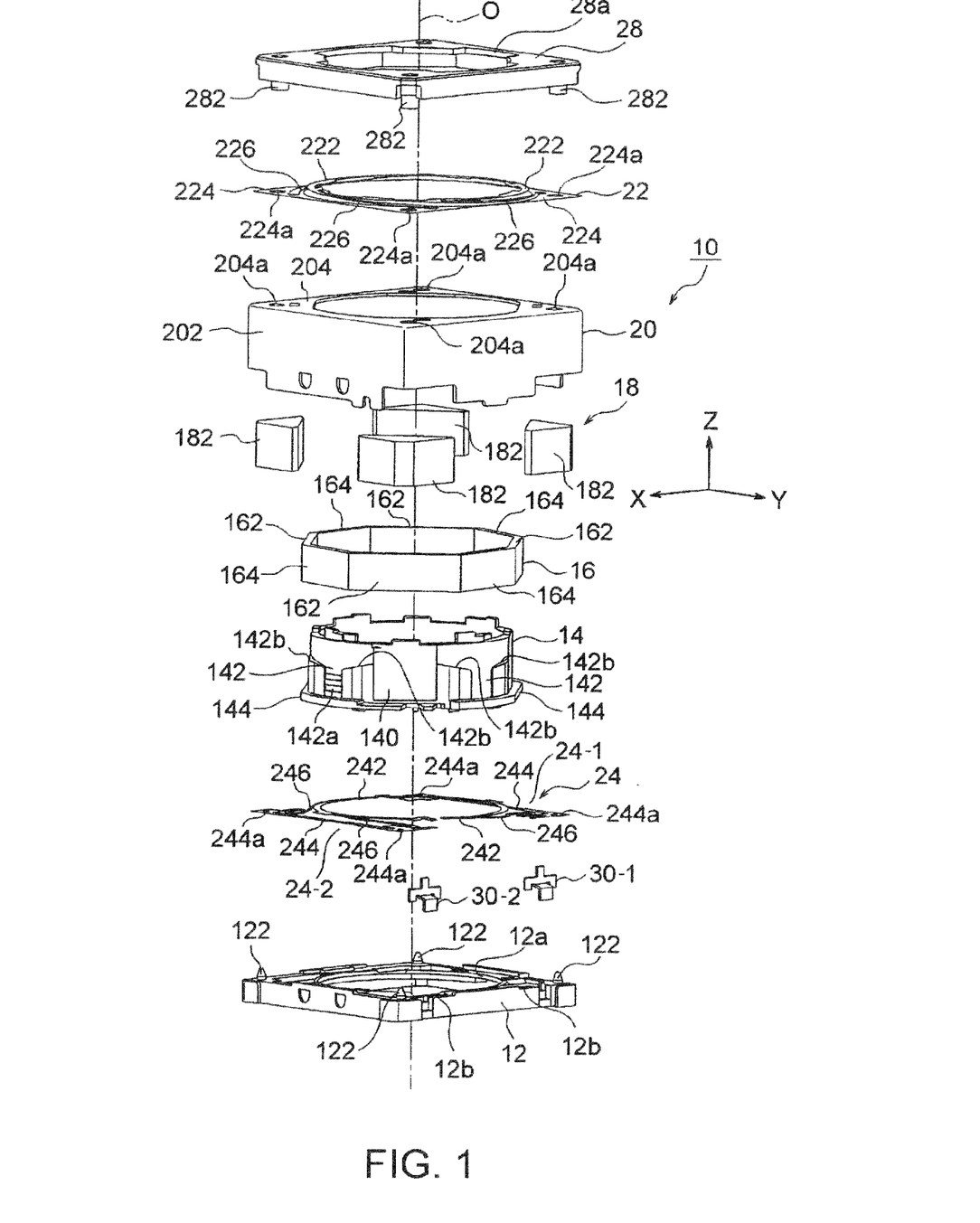
FIG. 1 is an exploded perspective view of a lens holder driving device according to an exemplary embodiment of the present invention.
Figure 2:
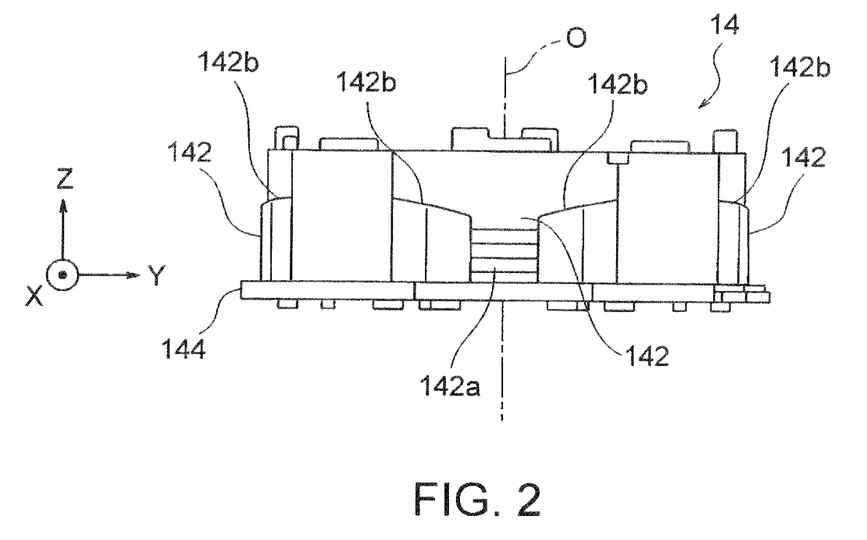
FIG. 2 is a front view of a lens holder for use in the lens holder driving device illustrated in FIG. 1.
Figure 3:
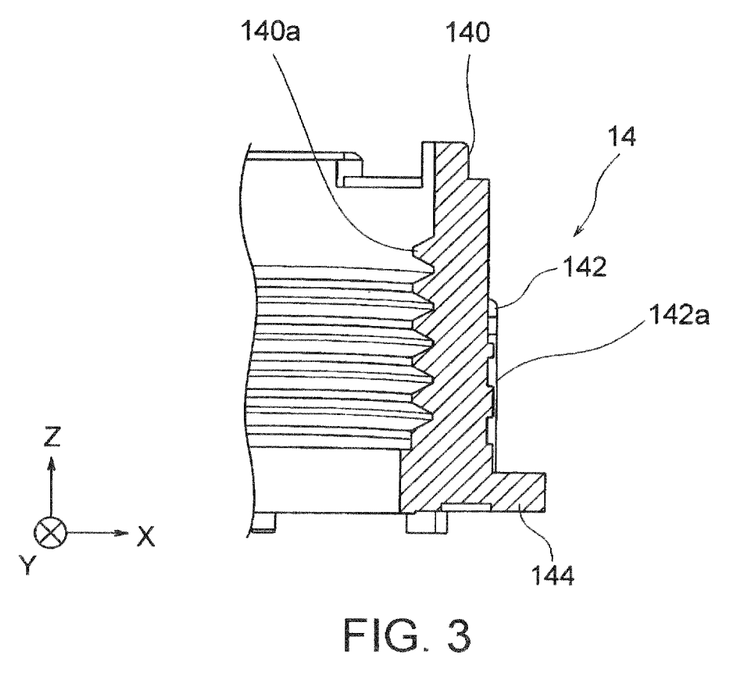
FIG. 3 is a partial cross sectional view of the lens holder illustrated in FIG. 2.

Referring to FIGS. 1 through 3, the description will proceed to a lens holder driving device (an actuator) 10 according to an exemplary embodiment of this invention. FIG. 1 is an exploded perspective view of the lens holder driving device (the actuator) 10. FIG. 2 is a plan view of a lens holder 14 for use in the lens holder driving device (the actuator) 10. FIG. 3 is a partial cross sectional view of the lens holder illustrated in FIG. 2.

Herein, in the manner shown in FIGS. 1 through 3, an orthogonal coordinate system (X, Y, Z) is used. In a state illustrated in FIGS. 1 through 3, in the orthogonal coordinate system (X, Y, Z), an X-axis direction is a fore-and-aft direction (a depth direction), a Y-axis direction is a left-and-right direction (a width direction), and a Z-axis direction is an up-and-down direction (a height direction). In addition, in the example being illustrated in FIGS. 1 through 3, the up-and-down direction Z is a direction of an optical axis O of a lens.

However, in an actual use situation, the direction of the optical axis O, namely, the Z-axis direction becomes a fore-and-aft direction. In other words, an upper direction of the Z-axis becomes a front direction while a lower direction of the Z-axis becomes a rear direction.

The illustrated lens holder driving device 10 is a lens holder driving device comprising, as a driving source (a driving method), a driving portion (a VCM method) of "moving coil method" using a voice coil motor (VCM).

The illustrated lens driving device 10 is mounted to a mobile terminal such as a camera-equipped cellular mobile phone which is enable to automatic focusing, a smart phone, a notebook personal computer, a tablet-type personal computer, a mobile-type game machine, a Web camera, a vehicle-mounted camera, or the like. The lens holder driving device 10 is for moving the lens holder 14 (which will later be described) capable of mounting a lens assembly (a lens barrel) (not shown) in the direction of the optical axis O. Accordingly, the optical axis O is a driving axis. The lens holder driving device 10 comprises an actuator base 12 which is disposed in a lower side (a rear side) in the Z-axis direction (the direction of the optical axis O). Although illustration is not made, the actuator base 12 has a lower portion (a rear portion) on which an image pickup device disposed on a sensor board is mounted. The image pickup device picks up a subject image formed by the lens assembly to convert it into an electric signal. The image pickup device may, for example, comprise a CCD (charge coupled device) type image sensor, a CMOS (complementary metal oxide semiconductor) type image sensor, or the like. Accordingly, a camera module comprises a combination of the lens holder driving device 10, the sensor board, and the image pickup device.

As an aside, it is desirable that a material of the actuator base 12 comprises a material having a high size precision and high heat resistance. In the example being illustrated, the material of the actuator base 12 comprises, for example, a liquid crystal polymer (LCP).

The lens holder driving device 10 comprises the lens holder 14 including a tubular portion 140 for holding the lens assembly (the lens barrel), a ring-shaped driving coil 16 fixed to the lens holder 14 so as to position around the tubular portion 140 thereof, a permanent magnet 18 disposed opposite to the driving coil 16, a yoke 20 for holding the permanent magnet 18, and a pair of leaf springs 22 and 24 disposed to both sides of the tubular portion 140 of the lens holder 14 in the direction of the optical axis O.

As an aside, it is desirable that a material of the lens holder 14 comprises a material having high heat resistance. In the example being illustrated, the material of the lens holder 14 comprises, for example, a polyamide (PA).

The permanent magnet 18 and the yoke 20 constitute a magnetic circuit (18, 20). A combination of the magnetic circuit (18, 20) and the driving coil 16 comprises the driving portion of the moving coil method.

The pair of leaf springs 22 and 24 supports the lens holder 14 in the direction of the optical axis O shiftably so as to position the lens holder 14 in a radial direction. In the pair of leaf springs 22 and 24, the one leaf spring 22 is called an upper leaf spring while another leaf spring 24 is called a lower leaf spring.

In addition, in the manner which is described above, in the actual use situation, the upper direction in the Z-axis direction (the direction of the optical axis O) becomes the front direction while the lower direction in the Z-axis direction (the direction of the optical axis O) becomes the rear direction. Accordingly, the upper leaf spring 22 is also called a front-side spring while the lower leaf spring 24 is also called a rear-side spring.

The upper leaf spring (the front-side spring) 22 and the lower leaf spring (the rear-side spring) 24 are made, for example, of metal such as a stainless steel or a beryllium copper. In addition, each of the upper leaf spring (the front-side spring) 22 and the lower leaf spring (the rear-side spring) 24 is manufactured by a press working against a predetermined thin plate or an etching working using photolithography technique. The etching working is desirable than the press working. This is because residual stress does not remain in the leaf spring in the etching working.

As shown in FIG. 1, the yoke 20 has a rectangular cylindrical shape. Specifically, the yoke 20 comprises an outer hollow cylindrical portion 202 having the rectangular cylindrical shape and a rectangular ring-shaped end portion 204 projecting from an upper end of the outer hollow cylindrical portion 202 inward. The outer hollow cylindrical portion 202 is also called a shielding yoke.

On the other hand, the driving coil 16 has an octagonal cylindrical shape. More specifically, the driving coil 16 comprises four long side portions 162 and four short side portions 164 disposed between the four long side portions. The tubular portion 140 of the lens holder 14 has four bonded surfaces 142 which project in the radial direction outward at regular spacings of 90 degrees around the optical axis O. To the four bonded surfaces 142, inner surfaces of the four short side portions 164 of the driving coil 16 are bonded by means of adhesives (adhesive resin) in the manner which will later be described. In addition, lens holder 14 has, at a lower end portion thereof, a positioning protrusion 144 which projects in the radial direction outward and which is for positioning a bottom portion of the driving coil 16. The positioning protrusion 144 is also called a ring end portion.

That is, the lens holder 14 has the four bonded surfaces 142 for bonding the four areas of the inner surface of the driving coil 16 (that are the inner surfaces of the four short side portion 164 in the example being illustrated) to the tubular portion 140 by means of the adhesives (the adhesive resin).

On the other hand, the permanent magnet 18 comprises four permanent magnet pieces 182 each of which has a substantially triangular pillar shape and which are disposed opposite to the four long side portions 162 of the driving coil 16. The four permanent magnet pieces 182 are disposed to inner walls at four corners of the outer hollow cylindrical portion (the shielding yoke) 202 of the yoke 20. At any rate, the permanent magnet 18 comprises the four permanent magnet pieces 182 each having the substantially triangular pillar shape that are mounted to the four corners of the outer hollow cylindrical portion (the shielding yoke) 202 of the yoke 20. In the manner as described above, at the inner surfaces of the four corners of the outer hollow cylindrical portion (the shielding yoke) 202 of the yoke 20, the permanent magnet 18 is disposed with a space between it and the driving coil 16.

The upper leaf spring 22 is disposed at an upper side of the lens holder 14 in the direction of the optical axis O while the lower leaf spring 24 is disposed at a lower side of the lens holder 14 in the direction of the optical axis O.

The upper leaf spring 22 comprises an inner end portion 222 mounted on the lens holder 14 and an outer end portion 224 mounted on the ring-shaped end portion 204 of the yoke 20 in the manner which will later be described. Between the inner end portion 222 and the outer end portion 224, four arm portions 226 are provided. Each arm portion 226 connects the inner end portion 222 to the outer end portion 224.

The outer end portion 224 of the upper leaf spring 22 is sandwiched between the ring-shaped end portion 204 of the yoke 20 and a cover 28 to be fixed to them. More specifically, the cover 28 has a rectangular ring shape which has an opening portion 28a at a central portion thereof. The cover 28 comprises four protrusions 282 which project at four corners thereof downward. The outer end portion 224 of the upper leaf spring 22 has four through holes 224a through which the four protrusions 282 pass. In addition, the ring-shaped end portion 204 of the yoke 20 has four fitting holes 204a in which the four protrusions 282 fit. Accordingly, the four protrusions 282 fit in the four fitting holes 204a of the ring-shaped end portion 204 of the yoke 20 through the four through holes 224a of the outer end portion 224 of the upper leaf spring 22. The cover 28 is fixed to the yoke 20 by heat-welding tips of the four protrusions 282 of the cover 28 and by bonding the cover 28 to the ring-shaped end portion 204 of the yoke 20 using thermosetting epoxy resin.

As an aside, in the example being illustrated, a material of cover 28 comprises, for example, a polycarbonate (PC).

The lower leaf spring 24 comprises an inner end portion 242 mounted on the lens holder 14 and an outer end portion 244 mounted on the actuator base 12 in the manner which will later be described. Between the inner end portion 242 and the outer end portion 244, four arm portions 246 are provided.

The inner end portion 242 of the lower leaf spring 24 is fixed to a lower end side of the lens holder 14.

On the other hand, the outer end portion 244 of the lower leaf spring 24 is fixed to the actuator base 12. More specifically, the actuator base 12 has a rectangular ring shape which has a circular opening portion 12a at a central portion thereof. The actuator base 12 comprises four protrusions 122 which project at four corners thereof upward. The outer end portion 244 of the lower leaf spring 24 has four fitting holes 224a in which the four protrusions 122 fit. The outer end portion 244 of the lower leaf spring 24 is fixed to the actuator base 12 by heat-welding tips of the four protrusions 122 and by bonding the outer end portion 244 of the lower leaf spring 24 to the actuator base 12 using thermosetting epoxy resin.

As show in FIG. 3, the tubular portion 140 of the lens holder 14 has an inner wall in which a female screw thread 140a is cut. On the other hand, although the illustration is not made, the lens assembly (the lens barrel) has an outer wall in which a male screw thread screwed in the above-mentioned female screw thread 140a is cut. In a case of fitting the lens assembly (the lens barrel) to the lens holder 14, it includes the steps of rotating the lens assembly (the lens barrel) with respect to the tubular portion 140 of the lens holder 14 around the optical axis O to screw it along the direction of the optical axis O thereby accommodating the lens assembly (the lens barrel) in the lens holder 14, and of connecting them to each other via an adhesive agent or the like.

Turning back to FIG. 1, the lens holder driving device 10 comprises first and second electrode terminals 30-1 and 30-2 which are for supplying the driving coil 16 with power. The actuator base 12 has a pair of insertion holes 12b for inserting and setting the first and the second electrode terminals 30-1 and 30-2. In addition, the lower leaf spring 24 comprises first and second leaf spring pieces 24-1 and 24-2 which are electrically insulated to each other. The first and the second electrode terminals 30-1 and 30-2 are electrically connected to the outer end portion 244 of the first and the second leaf spring pieces 24-1 and 24-2 by means of solder (not shown), respectively.

On the other hand, although the illustration is not made, the driving coil 16 has first and second end portions. The first and the second end portions of the driving coil 16 are tied up and soldered to the inner end portion 242 of the first and the second leaf spring pieces 24-1 and 24-2, respectively. The lens holder 14 comprises escaping portions (not shown) in the vicinity of the solder portions so as to be heatproofed.

Accordingly, by energizing the driving coil 16 via the first and the second leaf spring pieces 24-1 and 24-2 from the first and the second electrode terminals 30-1 and 30-2, it is possible to positionally adjust the lens holder 14 (the lens assembly) in the direction of the optical axis O according to interaction between a magnetic field of the permanent magnet 18 and a magnetic field due to an electric current flowing through the driving coil 16.

In the above-mentioned lens holder driving device 10, a combination of the lens holder 14 for holding the lens assembly and the driving coil 16 serves as a pillar movable portion (14, 16) disposed in a central portion. In addition, a combination of the actuator base 12, the permanent magnet 18, the yoke 20, and the cover 28 acts as a tubular fixed portion (12, 18, 20, 28) disposed around the movable portion (14, 16).

Figure 4:
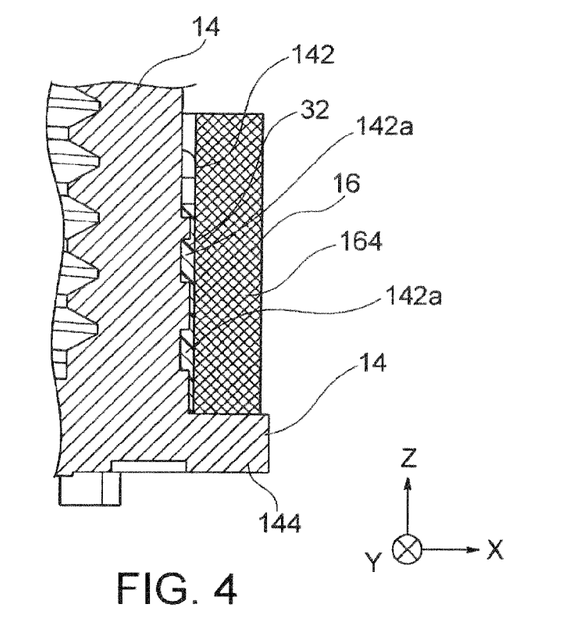
FIG. 4 is a partial enlarged cross sectional view showing a state where a driving coil is bonded to the lens holder.
Figure 5:
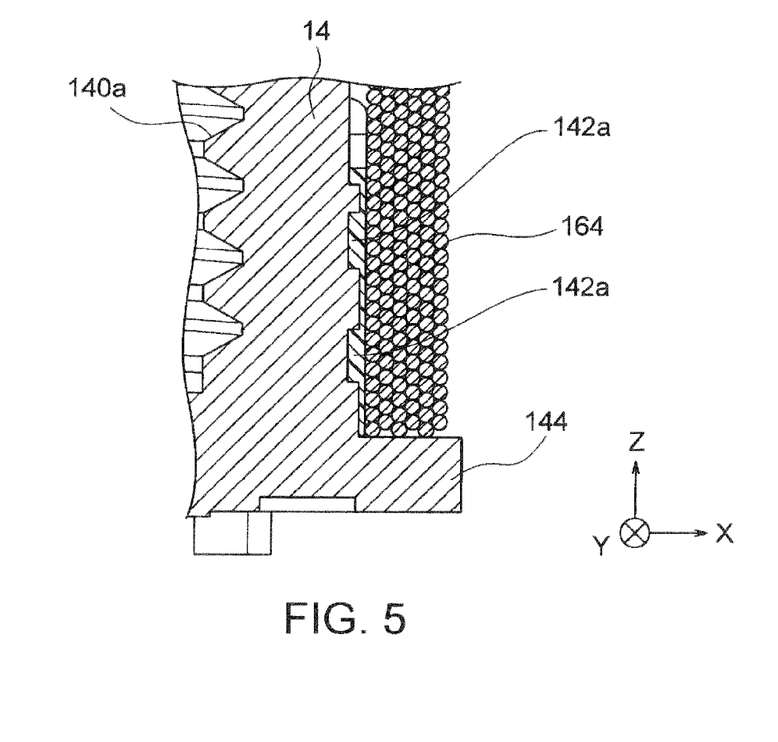
FIG. 5 is a partial enlarged cross sectional view showing the state illustrated in FIG. 4 in more detail.
Figure 6:
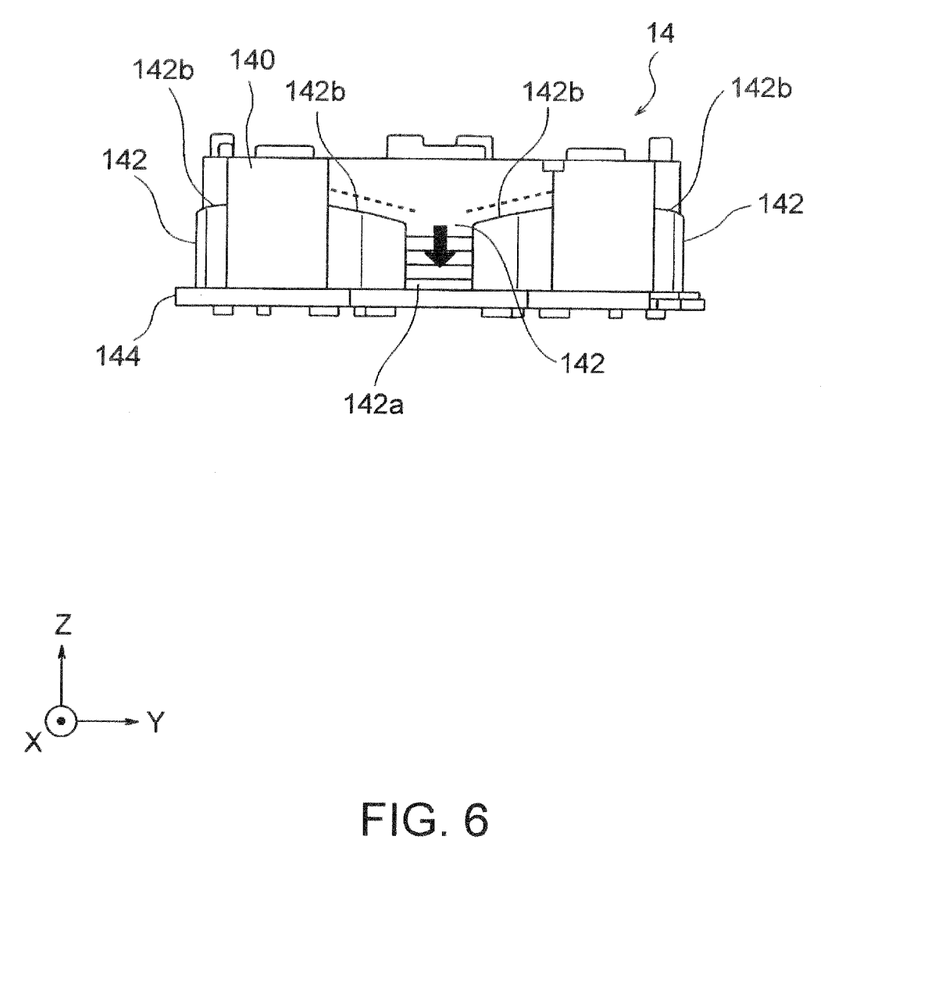
FIG. 6 is a front view of the lens holder showing a state where adhesive (adhesive resin) is poured into a bonded surface.

Referring to FIGS. 4 through 6 in addition to FIGS. 1 through 3, the description will proceed to fixed structure of the driving coil 16 for the lens holder 14. FIG. 4 is a partial enlarged cross sectional view showing a state where the driving coil 16 is bonded to the lens holder 14 by means of an adhesive agent (an adhesive resin) 32 and FIG. 5 is a partial enlarged cross sectional view showing the state illustrated in FIG. 4 in more detail. FIG. 6 is a front view of the lens holder 14 showing a state where the adhesive agent (the adhesive resin) is poured into a bonded surface.

As shown in FIG. 4, a distance between the optical axis O and each of the four bonded surface 142 is slightly shorter than a distance between the optical axis O and each of inner surfaces of the short side portions 164 of the driving coil 16.

As shown in FIG. 5, the driving coil 16 has a shape (structure) where a lead is wound in a coil fashion. Accordingly, filling a clearance between the bonded surface 142 of the lens holder 14 and the short side portion 164 of the driving coil 16, the adhesive agent (the adhesive resin) 32 (FIG. 4) penetrates in a clearance between the lead of the driving coil 16 and the inner surface of the driving coil 16.

In the example being illustrated, as shown in FIG. 3, each of two in the four bonded surfaces 142 that are opposite to each other with the optical axis O being sandwiched therebetween has two peeling preventing grooves 142a each of which extends in a direction orthogonal to a direction in parallel with the direction of the optical axis O. In the example being illustrated, the two bonded surfaces 142 in which the peeling preventing grooves 142a are formed are opposite to each other in the fore-and-aft direction X with the optical axis O being sandwiched therebetween.

The peeling preventing grooves 142a serve as a peeling inhibiting arrangement for inhibiting the driving coil 16 from peeling from the lens holder 14 after the four areas of the inner surface of the driving coil 16 (in this example, the inner surfaces of the four short side portions 164) are bonded to the four bonded surfaces 142 by means of the adhesive agent (the adhesive resin) 32, respectively.

In the manner which is described above, it is possible to dramatically improve adhesive strength between the lens holder 14 and the driving coil 16 by forming the peeling preventing grooves 142a acting as the peeling inhibiting arrangement in the two bonded surfaces 142.

The present inventor ran a drop test on the camera-equipped cellular mobile phone enable to automatic focusing (an artificial cabinet) comprising such as a lens holder driving device 10 having the fixed structure of the diving coil 16 for the lens holder 14. As a consequence of the drop test, the present inventor verified that the driving coil 16 is not peeled from the lens holder 14 in drops in every direction (forward, backward, rightward, leftward, upward, and downward).

In this connection, although the peeling preventing grooves 142a are formed on the two bonded surfaces 142 of the four bonded surfaces 142 that are opposite to each other in this exemplary embodiment, the peeling preventing grooves 142a may be formed all of the four bonded surfaces 142 or the peeling preventing grooves 142a may be formed at leant one bonded surface 142. In addition, although the two peeling preventing grooves 142a are formed on each bonded surface 142 in the exemplary embodiment, the number of the peeling preventing grooves 142a is not limited to two but may be one or three or more.

Further, although each peeling preventing groove 142a extends in the direction orthogonal to the direction in parallel with the direction of the optical axis O in the exemplary embodiment, an extending direction is not limited to this but each peeling preventing groove may be extend in a different direction different from the direction in parallel with the direction of the optical axis O.

Furthermore, although the peeling inhibiting arrangement takes the peeling preventing groove 142a formed in the bonded surface 142 as an example in the exemplary embodiment, the peeling inhibiting arrangement is not limited to this but may be any shape (structure) so long as it inhibits the driving coil 16 from peeling from the lens holder 14. For instance, the peeling inhibiting arrangement may be a plurality of concave portions formed in the bonded surface 142, may be a plurality of protrusions formed therein, and may be a plurality of bumps and dips formed therein.

In the illustrated lens holder driving device 10, the lens holder 14 further comprises inclined paths 142b formed in the tubular portion 140 in a slanting position upward from the four bonded surfaces 142.

Their inclined paths 142b serve as a filling arrangement for pouring the adhesive agent (the adhesive resin) 32 in the four bonded surfaces 142 as shown in arrows of FIG. 6. In this connection, as a manner of course, the filling arrangement is not limited to such inclined paths 142b.

Figure 7:
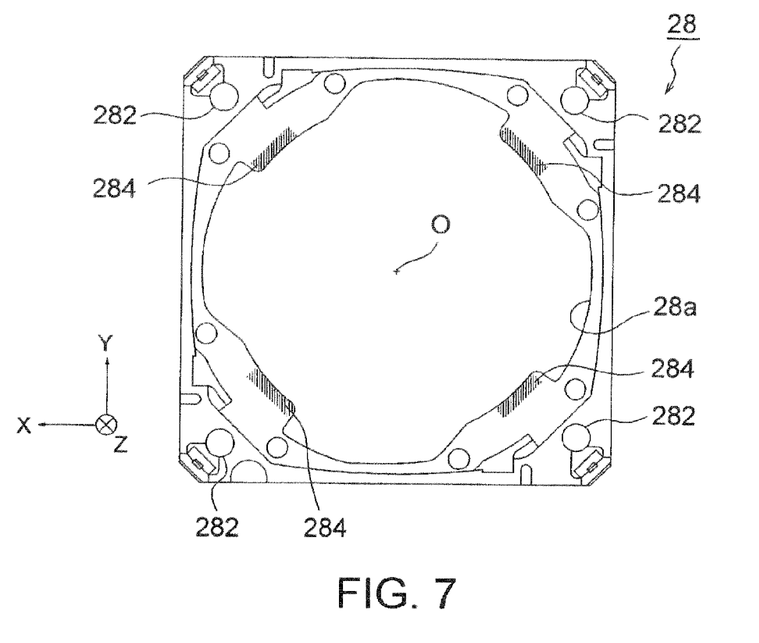
FIG. 7 is a bottom view of a cover for use in the lens holder driving device illustrated in FIG. 1.
Figure 8:
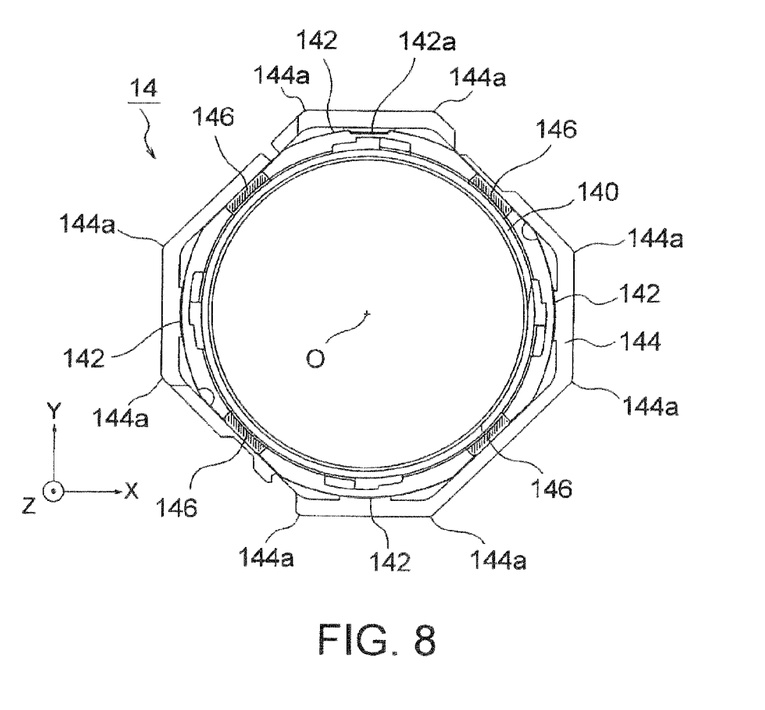
FIG. 8 is a plan view of the lens holder for use in the lens holder driving device illustrated in FIG. 1.
Figure 9:
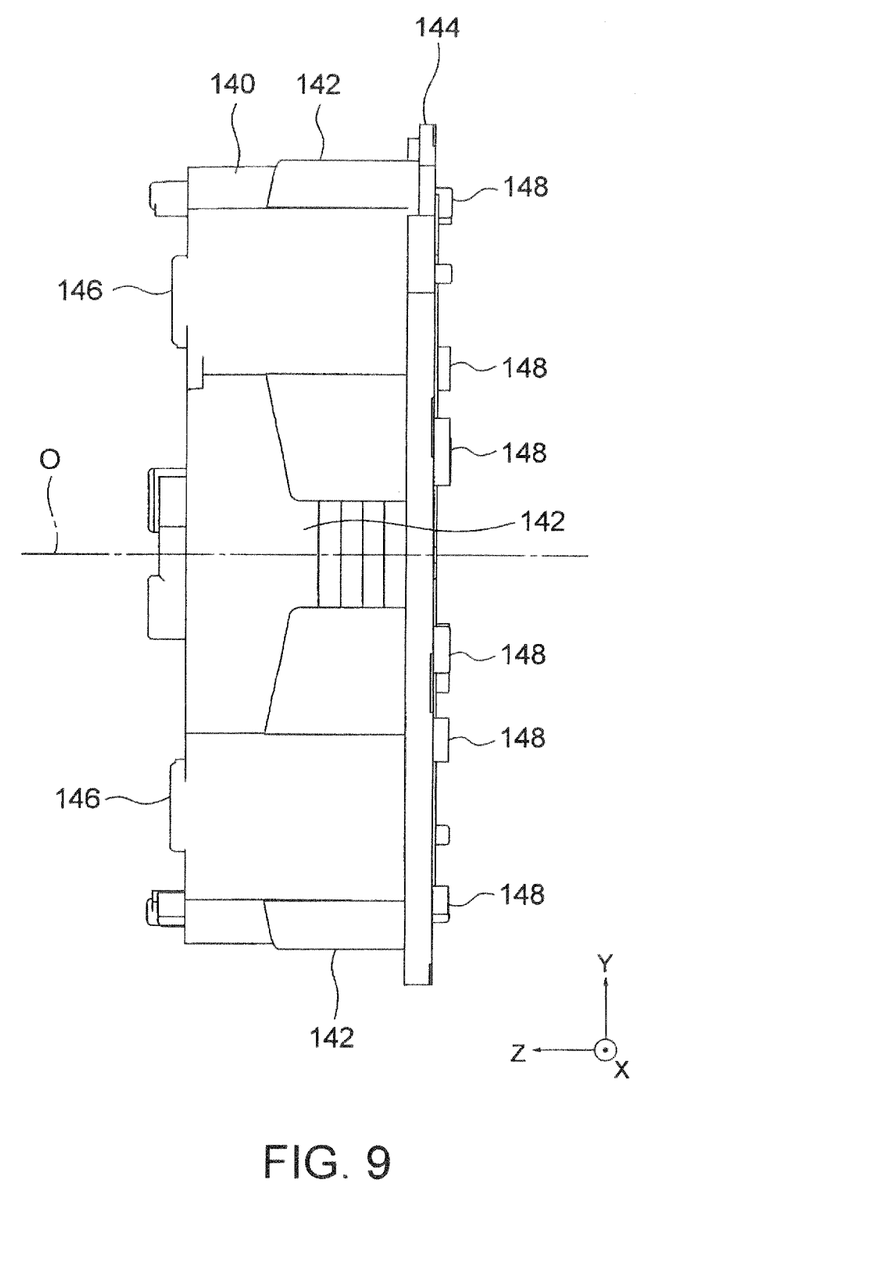
FIG. 9 is a front view of the lens holder illustrated in FIG. 8.
Figure 10:
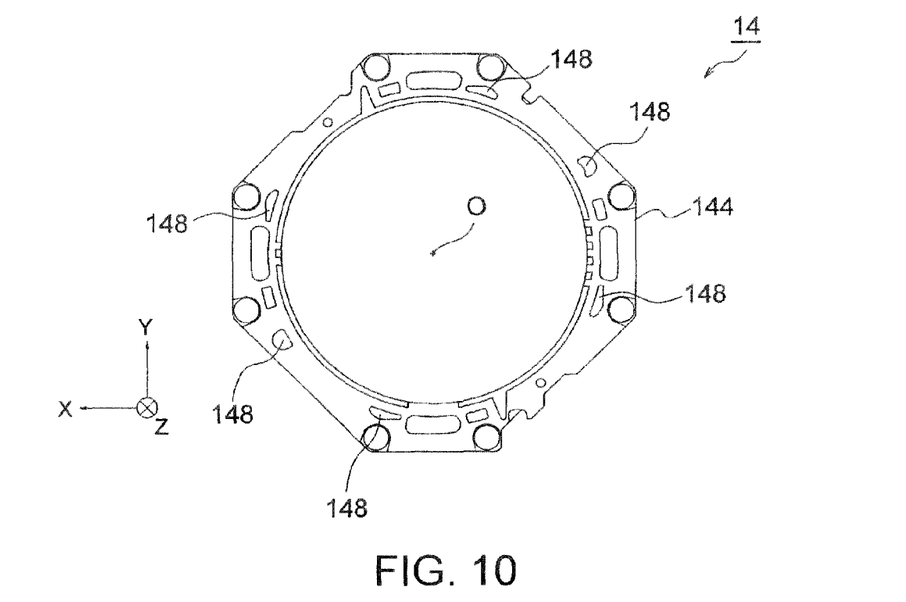
FIG. 10 is a bottom view of the lens holder illustrated in FIG. 8.
Figure 11:
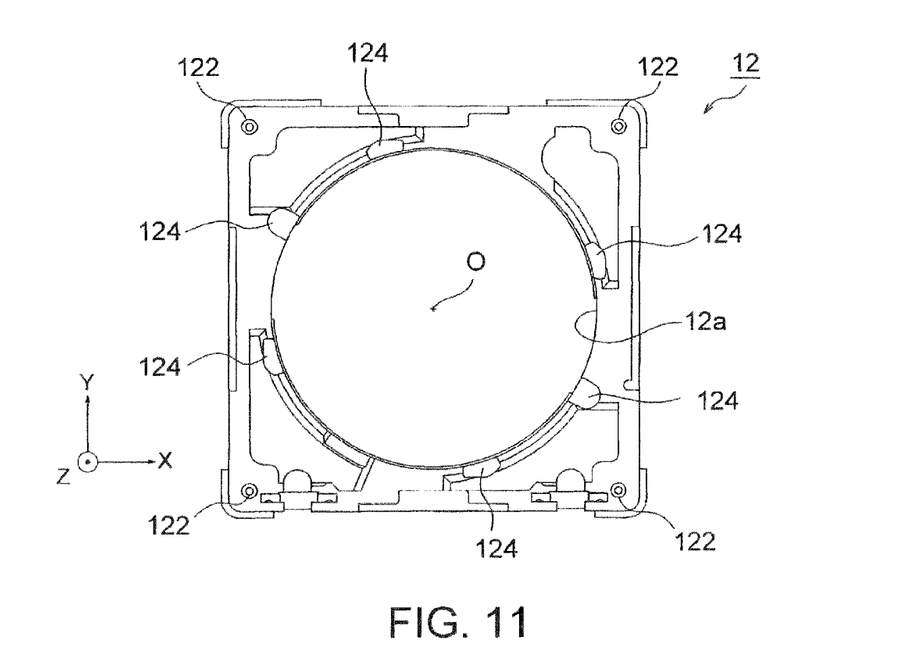
FIG. 11 is a front view of an actuator base for use in the lens holder driving device illustrated in FIG. 1.
Figure 12:
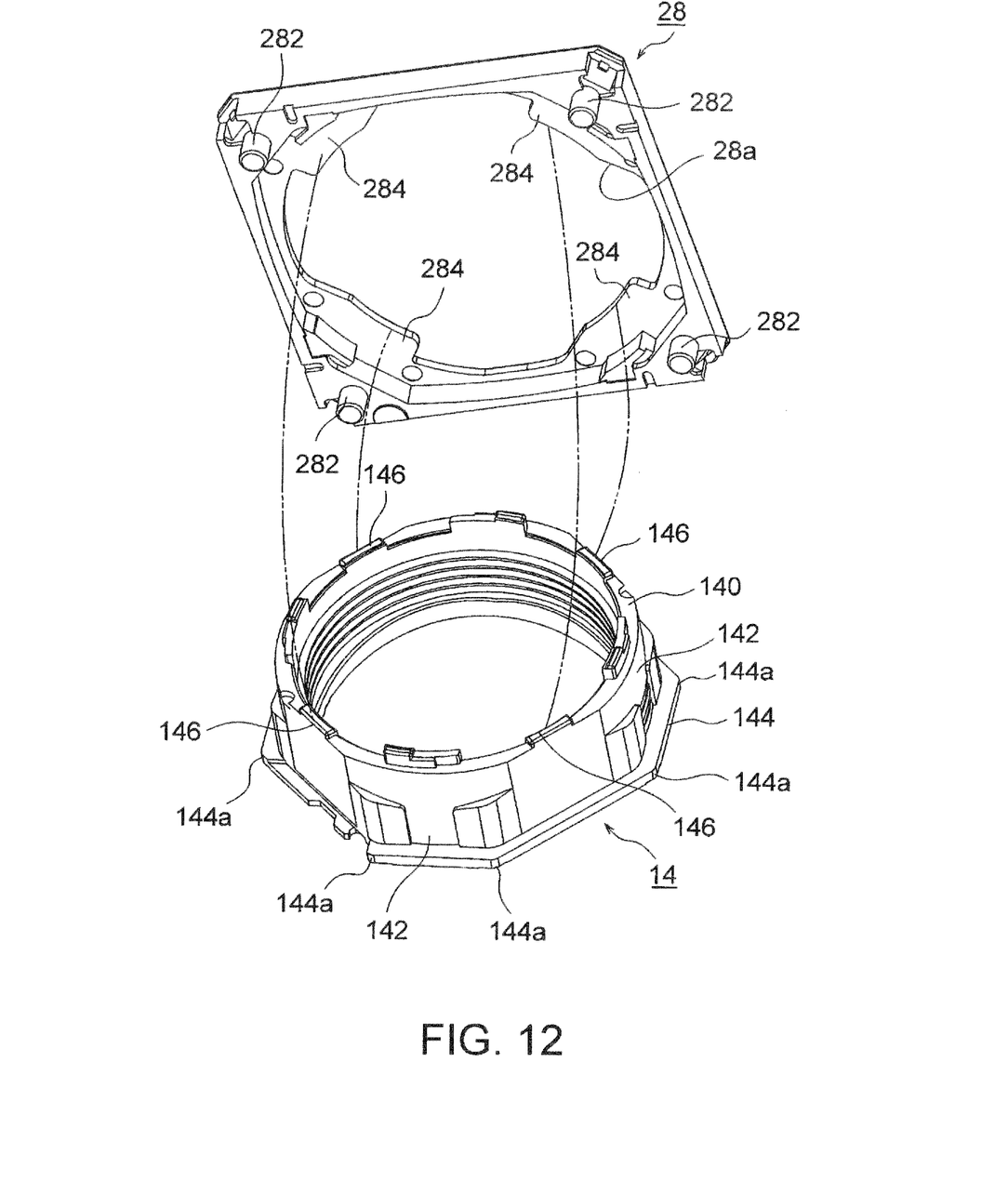
FIG. 12 is an explanation view showing stopper locations between the cover and the lens holder.
Figure 13:
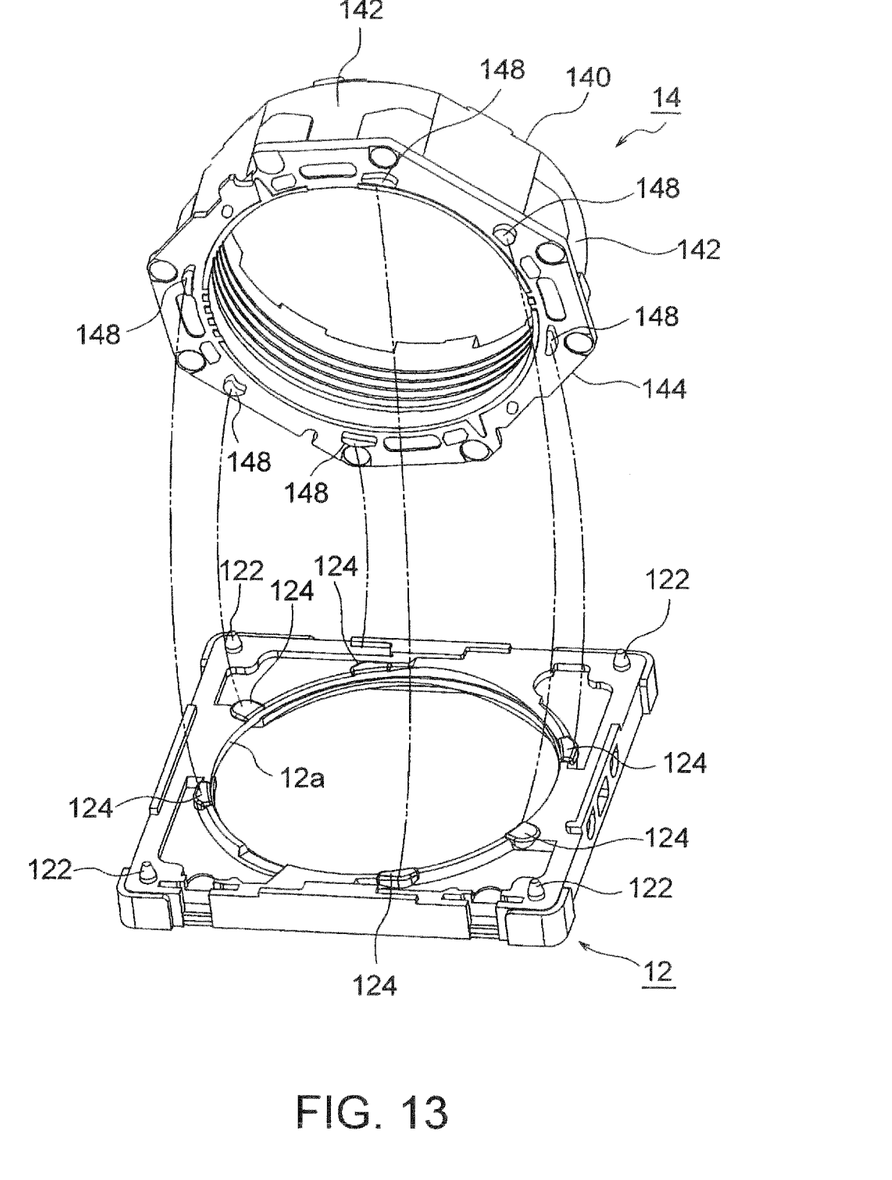
FIG. 13 is an explanation view showing stopper locations between the lens holder and the actuator base.

Referring now to FIGS. 7 through 14, the description will proceed to stoppers in the up-and-down direction Z of the lens holder 14. FIG. 7 is a bottom view of the cover 28 while FIG. 8 is a plan view of the lens holder 14. FIG. 9 is a front view of the lens holder 14. FIG. 10 is a bottom view of the lens holder 14 while FIG. 11 is a front view of the actuator base 12. FIG. 12 is an explanation view showing stopper locations between the cover 28 and the lens holder 14 while FIG. 13 is an explanation view showing stopper locations between the lens holder 14 and the actuator base 12.

As shown in FIG. 7, the cover 28 has four cover projections 284 each of which projects in the radial direction inwards. On the other hand, as shown in FIG. 8, the tubular portion 140 of the lens holder 14 has four holder upper projections 146 each of which projects upwards from an upper end thereof.

As shown in FIG. 12, when the lens holder 14 moves upwards, the four holder upper projections 146 engage with and stop at the corresponding four cover projections 284 of the cover 28, respectively. That is, the four cover projections 284 of the cover 28 act as an upper stopper (engaging/stopping member) for restricting an upward movement of the lens holder 14.

As shown in FIG. 11, the actuator base 12 has six base projections 124 each of which projects upward at a circumference of the circular opening portion 12a. On the other hand, as shown in FIG. 10, the ring end portion 144 of the lens holder 14 has six holder lower projections 148 each of which projects downward.

As shown in FIG. 13, when the lens holder 14 moves downward, the six holder lower projections 148 engage with and stop at the corresponding six base projections 124 of the actuator base 12, respectively. That is, the six base projections 124 of the actuator base 12 serve as a lower stopper (engaging/stopping member) for restricting a downward movement of the lens holder 14.

Figure 14:
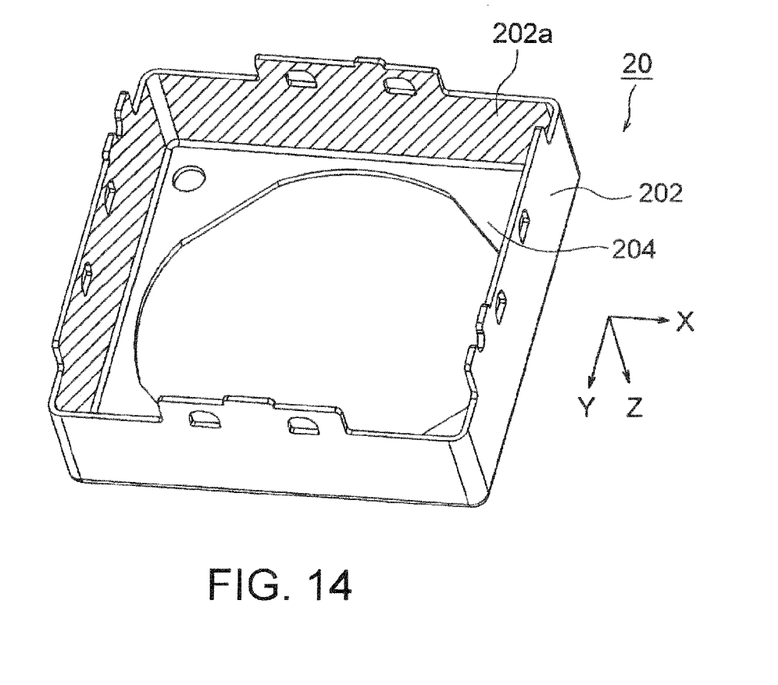
FIG. 14 is a perspective view of a yoke for use in the lens holder driving device illustrated in FIG. 1, seen from a bottom side.
Figure 15:
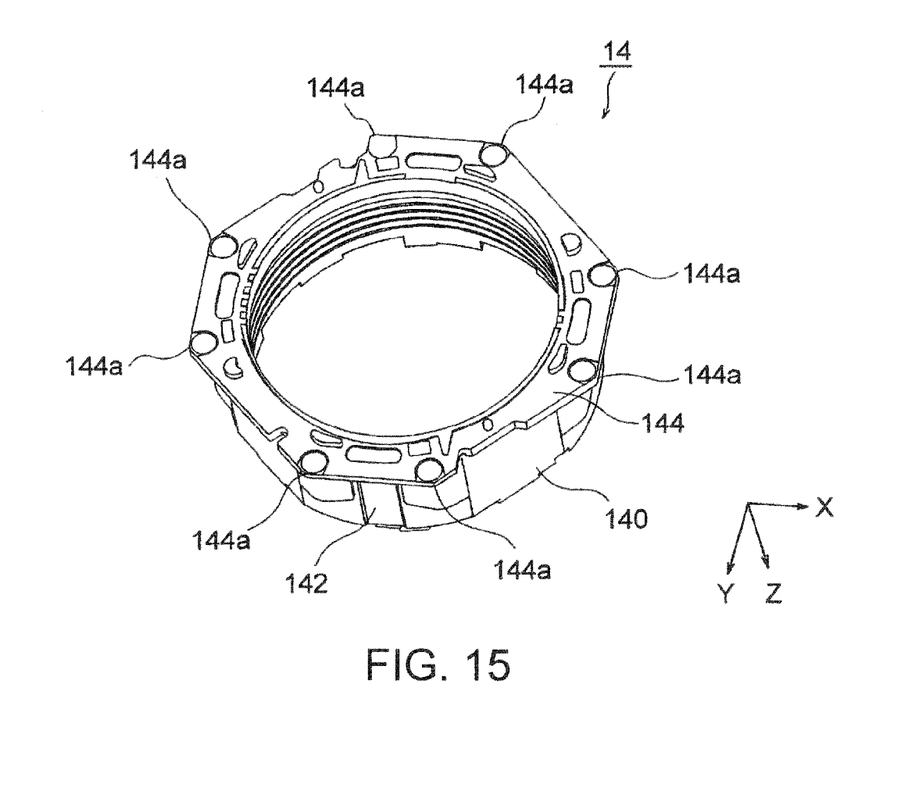
FIG. 15 is a perspective view of the lens holder for use in the lens holder driving device illustrated in FIG. 1, seen from a bottom side.
Figure 16:
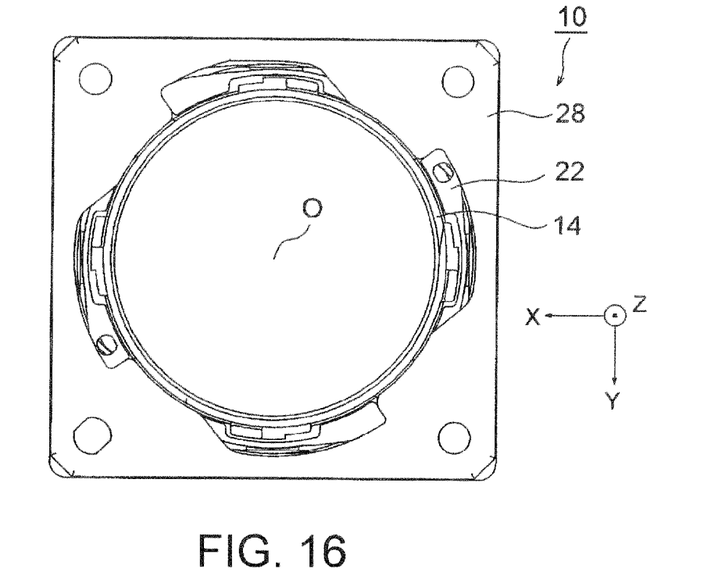
FIG. 16 is a plan view of the lens holder driving device illustrated in FIG. 1.
Figure 17:
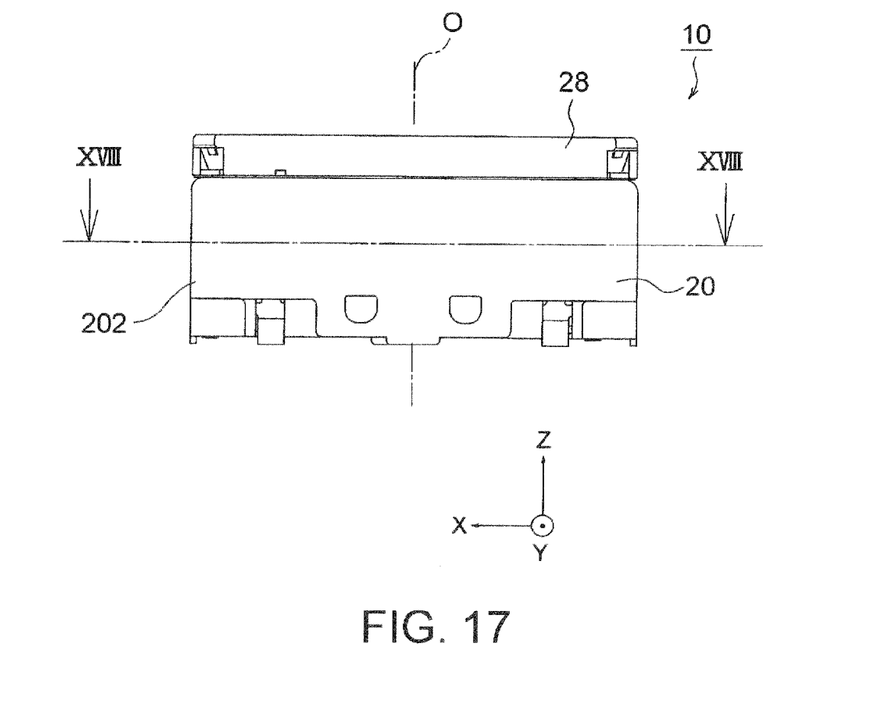
FIG. 17 is a side view of the lens holder driving device illustrated in FIG. 1.
Figure 18:
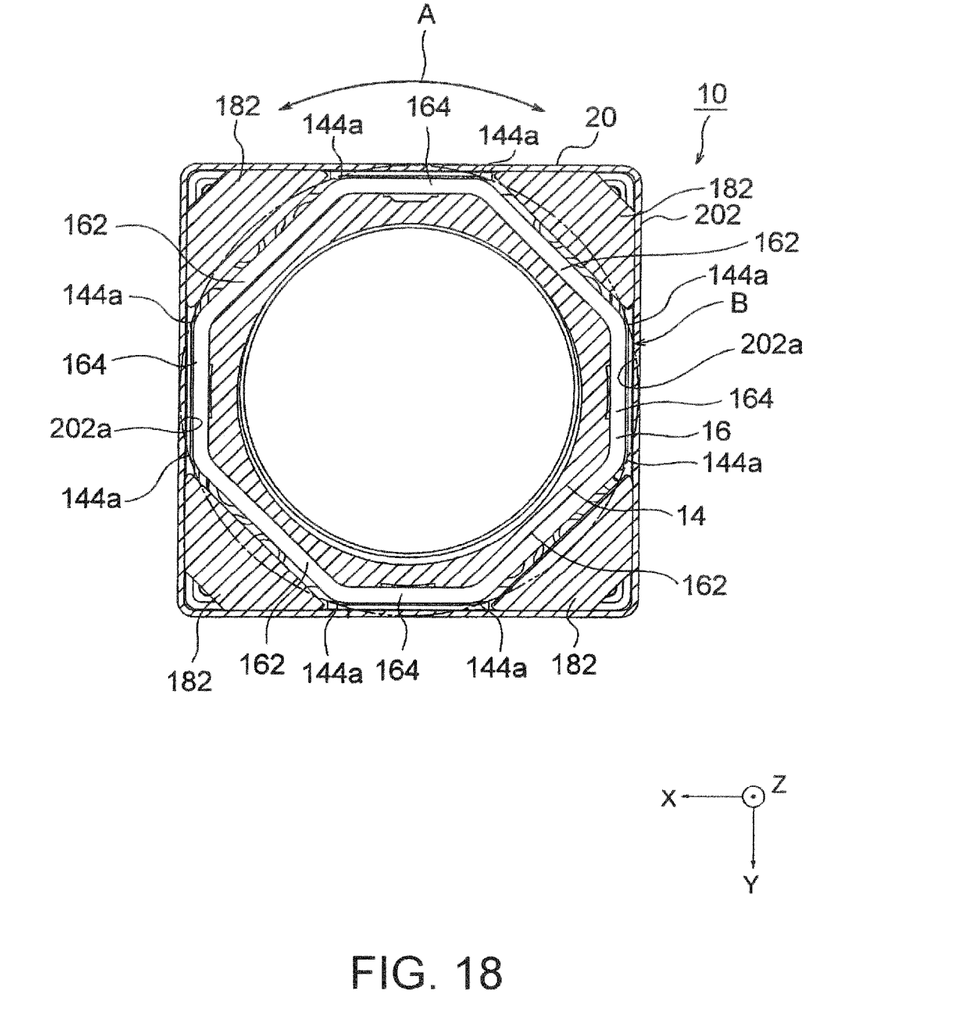
FIG. 18 is a sectional view taken along the lines XXIII-XXIII of FIG. 17.

Referring now to FIGS. 14 through 18, the description will proceed to a rotation restricting mechanism of the lens holder 14. FIG. 14 is a perspective view of the yoke 20 seen from a bottom side while FIG. 15 is a perspective view of the lens holder 14 seen from a bottom side. FIG. 16 is a plan view of the lens holder driving device 10, FIG. 17 is a side view of the lens holder driving device 10, and FIG. 18 is a sectional view taken along the lines XXIII-XXIII of FIG. 17.

As shown in FIG. 14, the outer hollow cylindrical portion 202 of the yoke 20 has an inner wall surface 202a. On the other hand, as shown in FIG. 15, the ring end portion 144 of the lens holder 14 has substantially an octagonal outside shape having eight apex portions 144a. The eight apex portions 144a of the ring end portion 144 are opposite to the inner wall surface 202a of the outer hollow cylindrical portion 202 of the yoke 20 with a predetermined spacing left therebetween.

Accordingly, when the lens holder 14 is about to rotate with respect to the yoke 20 around the optical axis O as shown in an arrow A of FIG. 18, any one apex portion 144a of the ring end portion 144 of the lens holder 14 comes into contact with (engages with) the inner wall surface 202a of the outer hollow cylindrical portion 202 of the yoke 20 at a position shown in B of FIG. 18, and it results in restricting the rotation of the lens holder 14.

While this invention has been particularly shown and described with reference to the exemplary embodiment thereof, the invention is not limited to the embodiment. It will be understood by those of ordinary skill in the art that various changes in form and details may be therein without departing from the spirit and scope of the present invention as defined by the claims.

For example, although the lens holder 14 has the four bonded surfaces 142 at the tubular portion 140 thereof in the above-mentioned exemplary embodiment, the number N of the bonded surfaces 142 may be in general two or more. In this event, it is preferable that the N bonded surfaces 142 are spaced uniformly at an angle of (360/N) degrees around the optical axis O.

The whole or part of the exemplary embodiments disclosed above can be described as, but not limited to, the following supplementary notes.

(Supplementary Note 1)

A lens holder driving device (10) comprising:

a lens holder (14) including a tubular portion (140) for holding a lens assembly; and a ring-shaped driving coil (16) fixed to said lens holder (14) so as to be positioned at outside circumference of the tubular portion (140), wherein said lens holder (14) has N bonded surfaces (142) for bonding N areas of an inner surface of said driving coil (16) to the tubular portion (140) by means of an adhesive agent (32), respectively, where N represents an integer which is not less than two, wherein at least one of said N bonded surfaces (142) has a peeling inhibiting arrangement (142a) for inhibiting said driving coil (16) from peeling from said lens holder (14) after the inner surface of said driving coil (16) is bonded to said N bonded surfaces (142) at the N areas thereof by means of said adhesive agent (32).

(Supplementary Note 2)

The lens holder driving device (10) according to Supplementary Note 1, wherein said lens holder driving device (10) comprises a pair of leaf springs (22, 24) disposed both sides of the tubular portion (140) of said lens holder (14) in a direction of an optical axis (O), said pair of leaf springs (22, 24) supporting said lens holder (14) in the direction of the optical axis (O) shiftably so as to position said lens holder (14) in a radial direction, wherein said peeling inhibiting arrangement comprises at least one peeling preventing groove (142a) which is formed on at least one of said N bonded surfaces (142) so as to extend in a different direction different from a direction in parallel with the direction of the optical axis (O).

(Supplementary Note 3)

The lens holder driving device (10) according to Supplementary Note 2, wherein said peeling inhibiting arrangement comprises a plurality of peeling preventing grooves (142a).

(Supplementary Note 4)

The lens holder driving device (10) according to Supplementary Note 2, wherein the different direction is a direction orthogonal to the direction in parallel with the direction of the optical axis (O).

(Supplementary Note 5)

The lens holder driving device (10) according to Supplementary Note 1, wherein said lens holder (14) further comprises, in the tubular portion (140), a filling arrangement (142b) for pouring the adhesive agent (32) into said N bonded surfaces (142).

(Supplementary Note 6)

The lens holder driving device (10) according to Supplementary Note 5, wherein said filling arrangement comprises inclined paths (142b) formed in said tubular portion (140) in a slanting position upward from said N bonded surfaces (142).

(Supplementary Note 7)

The lens holder driving device (10) according to Supplementary Note 2, wherein said N is equal to four, wherein four bonded surfaces (142) are spaced uniformly at an angle of 90 degrees around the optical axis (O), wherein a distance between said optical axis (O) and each of said four bonded surfaces (142) is slightly shorter than a distance between said optical axis (O) and each of the four areas of the inner surface of said driving coil (16).

(Supplementary Note 8)

The lens holder driving device (10) according to Supplementary Note 7, wherein said peeling inhibiting arrangement (140a) is formed in at least two bonded surfaces (142) of said four bonded surfaces (142) that are opposite to each other so as to sandwich said optical axis (O) therebetween.

(Supplementary Note 9)

The lens holder driving device (10) according to Supplementary Note 7, wherein said lens holder driving device (10) comprises a permanent magnet (18) opposite to said driving coil (16) and a yoke (20) for holding said permanent magnet (18), wherein said yoke (20) includes a tubular-shaped shielding yoke (202) having an inner wall in which said permanent magnet (18) is disposed, said shielding yoke (202) having a rectangular cylindrical shape, wherein said driving coil (16) has an octagonal cylindrical shape, said driving coil (16) comprising four long side portions (162) and four short side portions (164) disposed between the four long side portions (162), wherein said four short side portions (164) have inner surfaces which are bonded and fixed to the four bonded surfaces (142) of said lens holder (14), wherein said permanent magnet (18) comprises four permanent magnet pieces (182) each of which has a substantially triangular pillar shape and which are mounted to four corners of said shielding yoke (202).

In this connection, inasmuch as reference symbols in parentheses are attached in order to facilitate an understanding of this invention and are merely one example thereof, this invention is, of course, not limited to them.

What is claimed is:

1. A lens holder driving device comprising:
a lens holder including a tubular portion for holding a lens assembly, the tubular portion having an upper outside surface at an upper side thereof; and
a ring-shaped driving coil fixed to said lens holder so as to be positioned at an outside circumference of the tubular portion such that the driving coil is apart from the upper outside surface of the tubular portion,
wherein said lens holder has N bonded surfaces for bonding N areas of an inner surface of said driving coil to the tubular portion by means of an adhesive agent, respectively, where N represents an integer which is not less than two, the N bonded surfaces projecting from a lower side surface of the tubular portion in a radial direction outwardly, the lower side surface of the tubular portion extending from the upper outside surface of the tubular portion,
wherein at least one of said N bonded surfaces has a peeling inhibiting member for inhibiting said driving coil from peeling from said lens holder after the inner surface of said driving coil is bonded to said N bonded surfaces at the N areas thereof by means of said adhesive agent,
wherein said peeling inhibiting member comprises at least one peeling preventing groove which is formed on at least one of said N bonded surfaces so as to extend in a different direction from a direction in parallel with a direction of an optical axis,
wherein said lens holder further comprises, in the tubular portion, a filling member for pouring the adhesive agent into said N bonded surfaces, and
wherein said filling member comprises inclined paths formed in said tubular portion in a slanting position upward from said N bonded surfaces.

2. The lens holder driving device as claimed in claim 1, wherein said lens holder driving device comprises a pair of leaf springs disposed on both sides of the tubular portion of said lens holder in the direction of the optical axis, said pair of leaf springs supporting said lens holder in the direction of the optical axis shiftably so as to position said lens holder in the radial direction.

3. The lens holder driving device as claimed in claim 2, wherein said peeling inhibiting member comprises a plurality of peeling preventing grooves.

4. The lens holder driving device as claimed in claim 2, wherein the different direction is a direction orthogonal to the direction in parallel with the direction of the optical axis.

5. The lens holder driving device as claimed in claim 2, wherein said N is equal to four,
wherein four bonded surfaces are spaced uniformly at an angle of 90 degrees around the optical axis,
wherein a distance between said optical axis and each of said four bonded surfaces is slightly shorter than a distance between said optical axis and each of the four areas of the inner surface of said driving coil.

6. The lens holder driving device as claimed in claim 5, wherein said peeling inhibiting member is formed in at least two bonded surfaces of said four bonded surfaces that are opposite to each other so as to sandwich said optical axis therebetween.

7. The lens holder driving device as claimed in claim 5, wherein said lens holder driving device comprises a permanent magnet opposite to said driving coil and a yoke for holding said permanent magnet,
wherein said yoke includes a tubular-shaped shielding yoke having an inner wall in which said permanent magnet is disposed, said shielding yoke having a rectangular cylindrical shape,
wherein said driving coil has an octagonal cylindrical shape, said driving coil comprising four long side portions and four short side portions disposed between the four long side portions,
wherein said four short side portions have inner surfaces which are bonded and fixed to the four bonded surfaces of said lens holder,
wherein said permanent magnet comprises four permanent magnet pieces each of which has a substantially triangular pillar shape and which are mounted to four corners of said shielding yoke.

* * * * *